United States Patent
Marilly et al.

(10) Patent No.: US 7,103,801 B2
(45) Date of Patent: Sep. 5, 2006

(54) METHOD AND APPARATUS FOR ANALYZING ALARMS COMING FROM A COMMUNICATIONS NETWORK

(75) Inventors: Emmanuel Marilly, Antony (FR); Famory Toure, Massy (FR)

(73) Assignee: Alcatel, Paris (FR)

( * ) Notice: Subject to any disclaimer, the term of this patent is extended or adjusted under 35 U.S.C. 154(b) by 549 days.

(21) Appl. No.: 10/285,437

(22) Filed: Nov. 1, 2002

(65) Prior Publication Data

US 2003/0088669 A1    May 8, 2003

(30) Foreign Application Priority Data

Nov. 8, 2001    (FR)    .................................. 01 14458

(51) Int. Cl.
*G06F 11/00*    (2006.01)
(52) U.S. Cl. ...................................... 714/26
(58) Field of Classification Search ................ 714/26, 714/32, 33, 39, 37; 709/224, 207; 340/521, 340/522
See application file for complete search history.

(56) References Cited

U.S. PATENT DOCUMENTS

| | | | | |
|---|---|---|---|---|
| 5,748,098 A | * | 5/1998 | Grace | 370/242 |
| 5,751,209 A | * | 5/1998 | Werner et al. | 340/286.05 |
| 6,052,722 A | * | 4/2000 | Taghadoss | 709/223 |
| 6,493,687 B1 | * | 12/2002 | Wu et al. | 706/15 |
| 6,707,795 B1 | * | 3/2004 | Noorhosseini et al. | 370/242 |
| 2003/0220769 A1 | * | 11/2003 | Delegue et al. | 702/188 |
| 2003/0221005 A1 | * | 11/2003 | Betge-Brezetz et al. | 709/224 |

OTHER PUBLICATIONS

R. D. Gardner et al, "Pattern Discovery and Specification Techniques for Alarm Correlation", Network Operations and Management Symposium, 1998, Noms 98, IEEE New Orleans, LA Feb. 15-20, 1998, NY, pp. 713-722 XP010267436.

* cited by examiner

*Primary Examiner*—Nadeem Iqbal
(74) *Attorney, Agent, or Firm*—Sughrue Mion, PLLC

(57) ABSTRACT

The invention enables alarms (MA) coming from a network (4), such as a communications network, to be analyzed by a step of transforming the detected alarms (MA) into a signal (V(t)) which expresses variation in time of a numerical value representative of all of the detected alarms. This transformation can be implemented using a learning system, in particular a neural network (6). The signal can then be analyzed using various techniques, in particular time/frequency analysis techniques, in order to make a diagnosis.

20 Claims, 4 Drawing Sheets

METHOD AND APPARATUS FOR ANALYZING ALARMS COMING FROM A COMMUNICATIONS NETWORK

The invention relates to a method and apparatus for analyzing alarms circulating in a network, which network may be an optical fiber, wire, radio, or analog telecommunications network, or any other type of network. In this context, an alarm is in the form of a message conveying information suitable for determining the cause of the event that has given rise to the alarm, typically the failure of a specific part, a local overload, a software error, etc. In general, an alarm message comprises the identity of the equipment and of its sub-equipment(s) in question, its location in the network, the type of failure or of warning to be issued, e.g. a degree of urgency, together with the time and date at which it occurred. A diagnostic apparatus for the network serves to handle and analyze such alarms in order to issue a diagnosis and act accordingly.

Purely by way of illustration, the description below relates to the specific circumstance of a synchronous digital hierarchy (SDH) optical fiber type telecommunications network. The meshing of the network equipment (nodes and links) means that a failure or a warning emanating from one element of the network will generally have repercussions on other elements, which can themselves then be caused to trigger other alarms, and so on, giving rise to an avalanche of alarms. This leads to chaotic alarm propagation through the network, and it is on the basis of this chastic propagation that the diagnostic apparatus needs to identify the original alarm or group of alarms, referred to as the "root alarm" in order to be able to diagnose appropriately to be able to take action. It is recalled that in a large network, the diagnostic apparatus may receive several hundreds of alarms that are dispersed and mixed in with the root alarm.

In the state of the art, the stream of alarm messages is preprocessed by filtering seeking to eliminate redundant alarms and/or to group together alarms which are pertinent.

For this purpose, correlation and alarm diagnosis techniques are implemented using an approach based either on "symptoms" or else on modeling.

The first case relies on symptoms that correspond to fault relationships in order to define a set of rules for each fault. This applies in particular to expert systems based on artificial intelligence which operate in application of a set of rules, and also by using techniques dedicated to dynamic systems and based on "chronicles" as described by C. Dousson in "Alarm driven supervision for telecommunications networks: II-on-line chronicle recognition", published by Annals of Telecommunications, pp. 501–502, October 1996, CNET, France.

A diagnosis is then obtained in the form of a conclusion to be drawn from certain alarm conditions that are present. For example, one rule may stipulate that if alarm A is present at time t1, alarm B at time t2, . . . , etc., then the breakdown is of type Pi selected from a relatively large number of possible types.

In the second case, a model is established which describes the behavior of the system in order to devise a simulator which produces scenarios for pertinent and identified faults. An example of this approach is described by P. Laborie and J. P. Krivine in the article "Automatic generation of chronicles and its application to alarm processing in power distribution systems", 8th International Workshop on Diagnosis, Mt. St. Michel, France.

At present, the approach based on symptoms is preferred because it makes it possible to make use of empirical rules for describing symptoms.

Nevertheless, known solutions present difficulties in acquiring knowledge for the expert system. Updating this expertise as a function of the way a system changes also raises a problem which needs to be taken into account when components are the subject of frequent changes (topological or functional). Any change to the training field involves a large amount of maintenance, with the rules being adapted and modified. Unfortunately, tracking such changes requires personnel to be trained in a manner that is suitable for acting on expert systems. In addition, such systems do not provide any support for new data or for modifications to existing data. If an event is not received (e.g. a missing data item), then the rule becomes inapplicable. In other words, the rules are not "robust". Furthermore, the methods learn nothing from their experience and adapt with difficulty to changes in the network.

It can be seen that those techniques do not provide good performance when placed with uncertainty and they lend themselves poorly to analyzing a large number of data items that are uncorrelated, ambiguous, or incomplete.

In the light of the above, in a first aspect, the invention proposes a method of analyzing alarms coming from a network, characterized in that it includes a step of transforming the detected alarms into a signal which expresses the variation in time of a digital value representative of all of the detected alarms.

Advantageously, the transformation step is performed by means of a learning system, e.g. a neural network.

When each alarm is made up of data fields, it is possible to subdivide the inputs to the learning system into groups, each group being dedicated specifically to a respective field that is taken into account.

In which case, a particular input of a group of inputs can be selected as a function of the content of the field to which said group is dedicated, each input of a group corresponding to a specific content of a field.

Preferably, at least one group of inputs is provided that is dedicated respectively to one of the following alarm data fields:

a first level of alarm localization, e.g. a type of network equipment;

a second level of alarm localization, e.g. a piece of equipment;

a reason for an alarm; and an indication of priority.

In the embodiment under consideration, a detected alarm is applied to the input of the learning system by selectively positioning one input in each group of inputs in a determined logic state.

Each input may correspond to an input neurone of a neural network, the input neurones being subdivided into groups of inputs.

Advantageously, a prior stage of training the learning system is performed using steps of correlating the input and the output of the system on the basis of examples of alarm messages.

Preferably, said signal is obtained in the form of the value of a binary word expressed by the output neurones of the learning system.

Advantageously, it further comprises a step of processing the signal delivered by the transformation step, on the basis of which usable information is extracted.

Said processing may comprise time/frequency analysis of the signal in order to make a diagnosis, e.g. using a technique of the Cohen class.

In an envisaged option, the Wigner Ville distribution is used to produce a bilinear distribution of the energy of the signal.

It is also possible to locate peaks in the distribution obtained by the time/frequency analysis, and to extract respective vectors therefrom corresponding to identified alarm signatures.

It is then possible to interpret the distribution in terms of time and frequency on a linear scale.

The processing may also comprise time/scale analysis of the signal in order to make a diagnosis.

In which case, it is possible to produce wavelet transforms in order to change the signal into coefficients for use in diagnosis, e.g. by means of a scalogram.

The processing may also comprise applying frequency analysis only to the signal, e.g. Fourier analysis, in order to make a diagnosis on the basis of the resulting spectrum.

For example, peaks in the spectrum can be located, from which respective vectors can be extracted which correspond to identified alarm signatures.

In a second aspect, the invention provides apparatus for analyzing alarms coming from a network, the apparatus being characterized in that it comprises transformation means for transforming detected alarms into a signal which expresses variation in time of a numerical value representative of all of the detected alarms.

The apparatus may further comprise means for processing the signal from the transformation means, from which usable information is extracted.

In a third aspect, the invention provides apparatus of the second aspect adapted to perform the method of the first aspect.

The invention and the advantages which stem therefrom appear more clearly on reading the following description of preferred embodiments, given purely as non-limiting examples and with reference to the accompanying drawings, in which.

Figure 1:
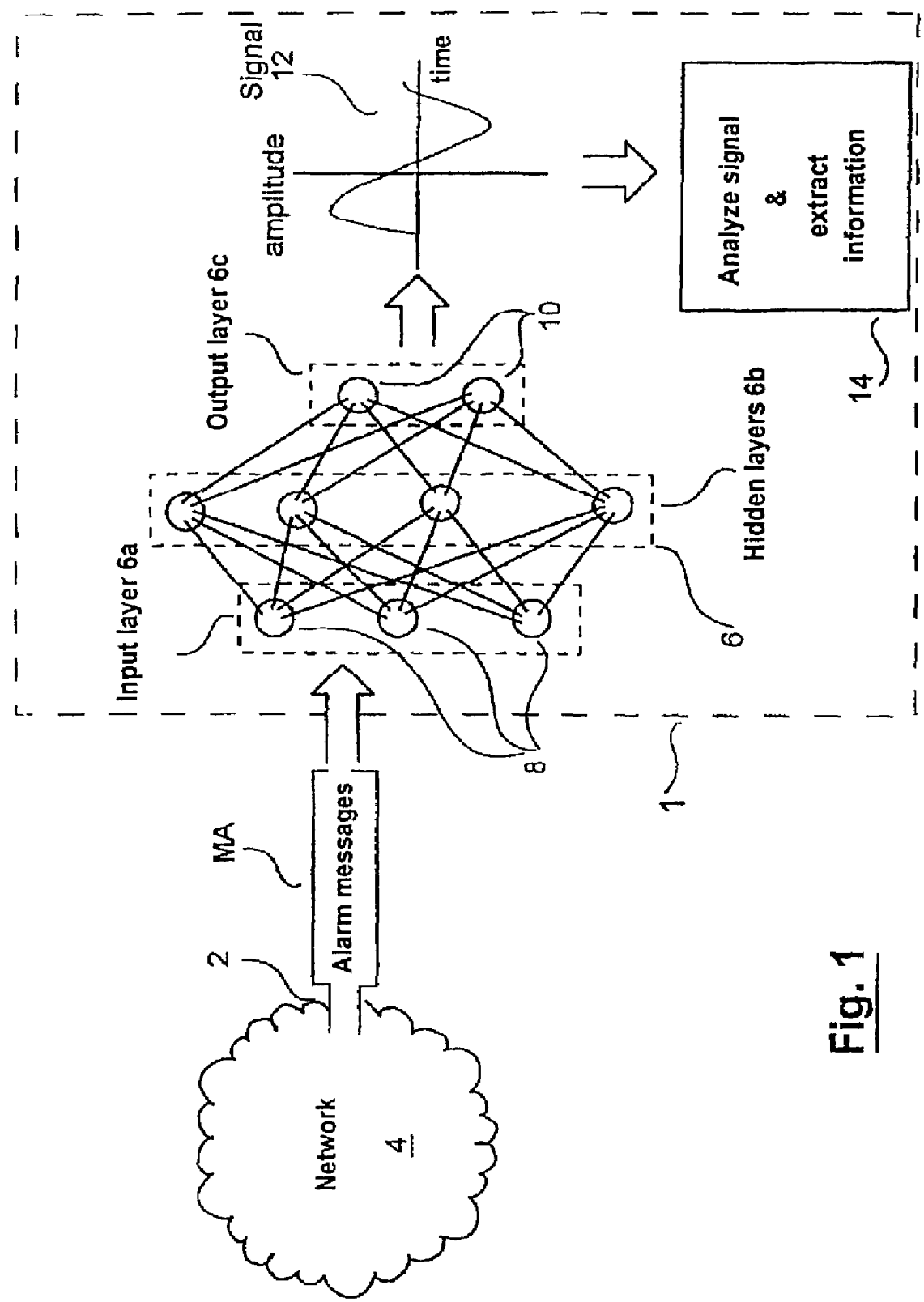
FIG. 1 is a simplified block diagram of a unit for identifying alarms in a preferred embodiment of the invention.

As shown in FIG. 1, the embodiment provides an alarm-identifying unit 1 connected to an access port 2 of a communications network 4, and specifically an SDH optical fiber type network. The access port 2 is adapted to receive all of the alarm messages MA circulating in the network 4, and to forward them to a preprocessor. This preprocessor comprises a multilayer neural network 6 with back propagation or back propagation of the error gradient ("feedforward"), having the following topology:

an input layer 6a constituted by a number Ne of input neurones 8;

one or more hidden layers 6b; and an output layer 6c constituted by a number Ns of output neurones 10 where Ns is less than Ne.

In the example shown, used for explanatory purposes, the numbers of input and output neurones are respectively Ne=64 and Ns=5, the network 6 having two hidden layers 6b each comprising 129 neurones. This serves to greatly reduce the number of alarms (by going from 64 neurones to 5 in this example) by eliminating alarms that are not filtered, redundant, etc.

The input and output neurones operate with two binary states 0 and 1 enabling binary patterns to be expressed.

The neural network 6 can be implemented using various hardware and software techniques that are known in themselves. It can easily be adapted to any network 4 having alarms that are to be monitored, in particular concerning the numbers of input and output neurones, the functions given to each neurone, etc.

The intermediate layers 6b process the bulk of the information applied to the input layer 6a, seeking to reproduce that information on the output layer 6c in globalized form that is easier to understand. The information coming from the output layer 6c is in the form of a two-dimensional dynamic signal 12, i.e. a signal that varies in time and in amplitude, which signal contains all of the information that is pertinent to diagnosing alarms, in particular for identifying the root alarm that has originated all of the other alarm messages. The neural network 6 thus performs preprocessing and correlation functions. In this case correlation amounts to extracting an alarm vector, i.e. the signature of the failure or the warning, making it possible subsequently to interpret the information and to condense it simultaneously.

Sophisticated signal processing techniques can then be used downstream to extract this pertinent information and to facilitate diagnosis.

Thus, in the example, the signal 12 is presented to a signal analyzer and information extractor 14 referred to below as an extractor which enables pertinent information to be obtained concerning specifically the root alarm.

For a better understanding of other features of the unit 1, these are described in the context of a specific example of operation.

Each alarm message MA issued by the network 4 is formatted in an established protocol giving: the time and date of the beginning of the message, the identifier of the type of network equipment concerned, or a first level of localization, the part originating the alarm within said equipment, i.e. a second level of localization, a short description of the reason for the alarm, and a priority indication.

Figure 2:
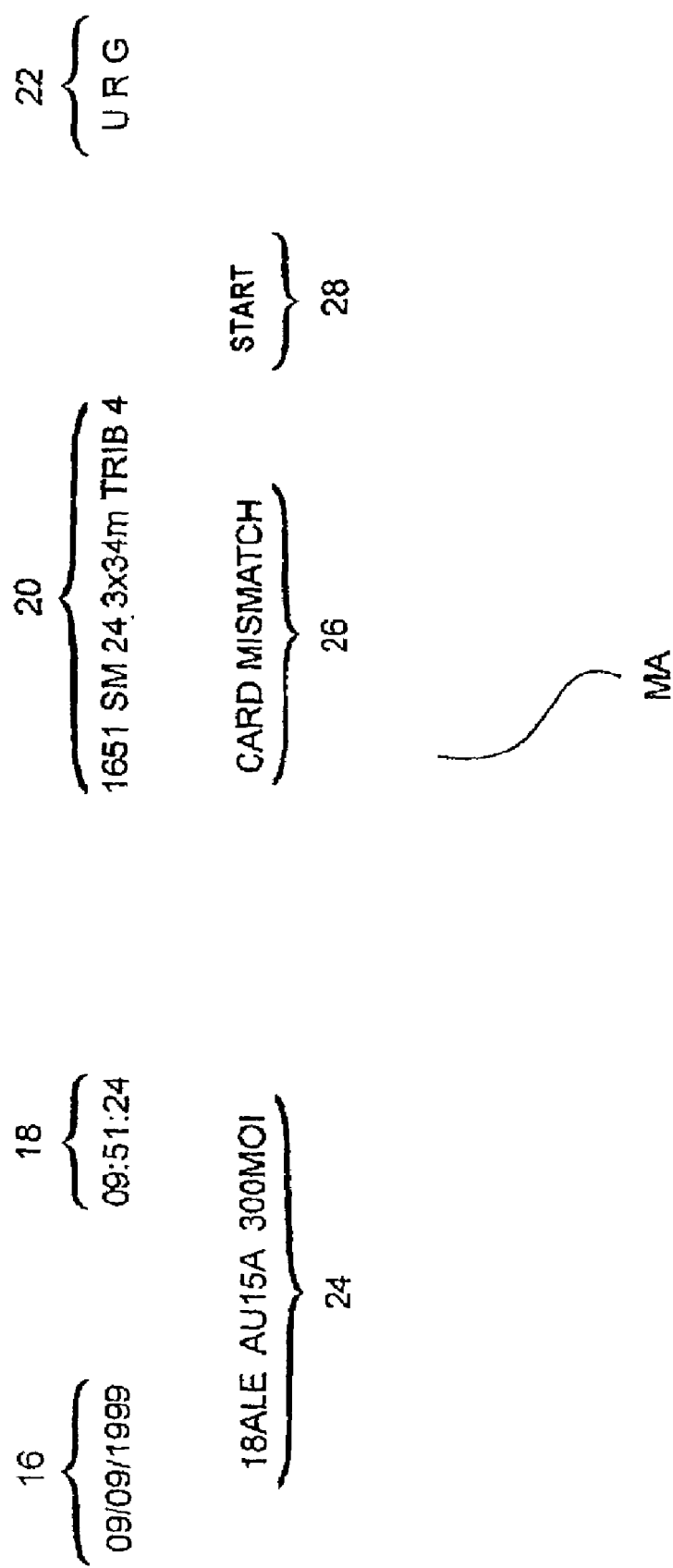
FIG. 2 is an example of the content of an alarm message for handling by the alarm-identifying unit.

An example of an alarm message MA in the "Nectas" format is given in FIG. 2, where there can be seen the date field 16, the time of day field 18, the type of equipment in question 20, the priority indicator 22 ("urgent"), the identity of the piece of equipment 24, the reason for the alarm 26 ("Card Mismatch"), and a start of message indicator 28.

The message MA is encoded on input to the identifier unit 1 as a binary word occupying Ne bits, each of which sets the logic state of a respective one of the input neurones 8.

Figure 3:
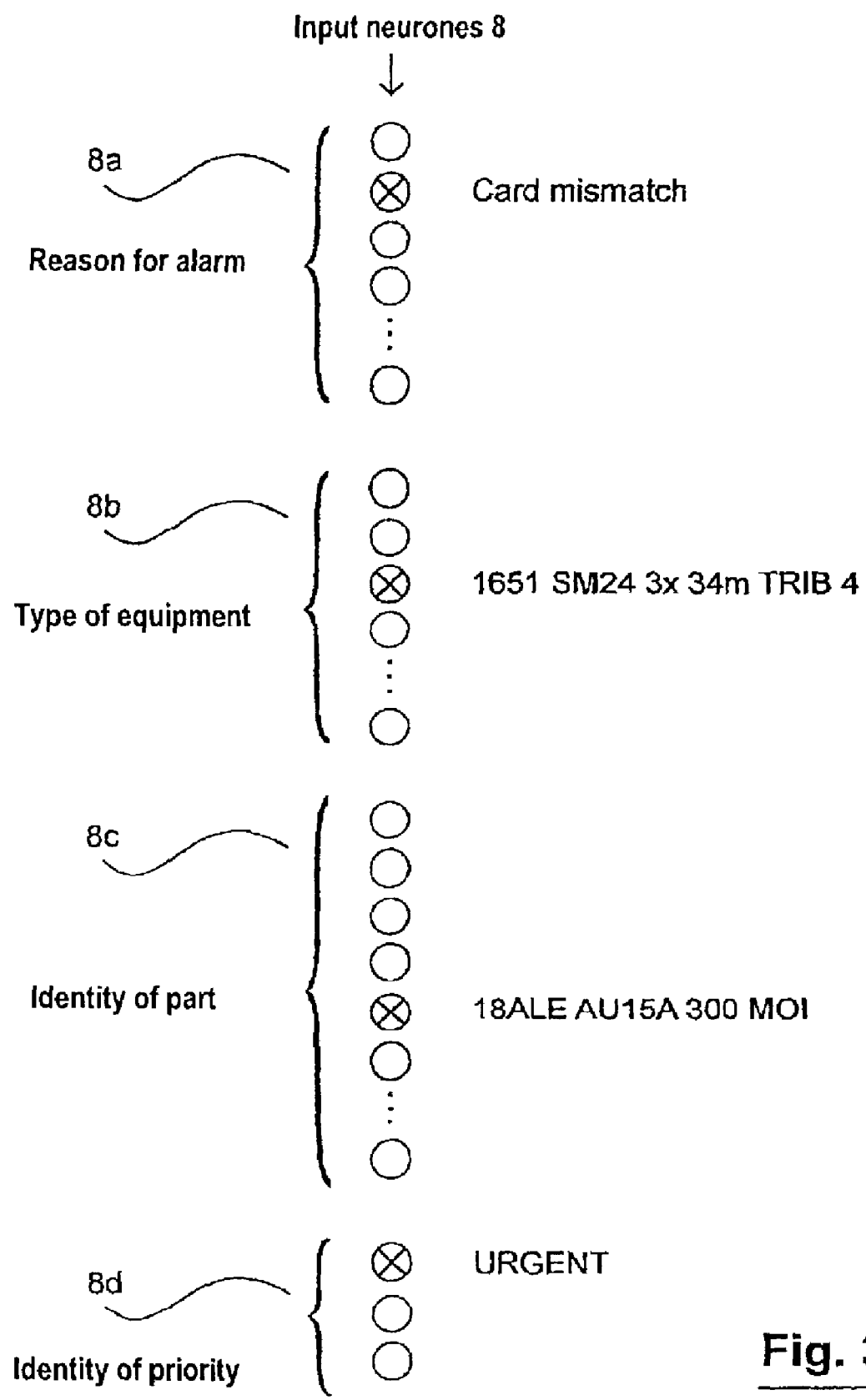
FIG. 3 is a symbolic representation of the input neurones of the neural network in the alarm-identifying unit, showing how they are subdivided into groups of input neurones, each group being dedicated to a particular field of the alarm message.

As shown in FIG. 3, the organization of coding and of input neurones 8 (individually represented by "O" symbols in a column) is arranged in groups of neurones 8a to 8d. Each group of neurones is allocated to a determined field of the message MA. Within each group, there exists a neurone that is specific to one possible content of the corresponding field. When this content appears in the input alarm message, the neurone allocated thereto is set to the logic 1 state (represented by an "x" in the corresponding "O" symbol). The other neurones in the group remain in the 0 state, which is the default logic position.

Thus, a first group 8a of input neurones 8 dedicated to the field for the reason of the alarm has as many neurones as there are different possible reasons for an alarm. Similarly, a second group 8b of input neurones dedicated to the field for the type of equipment has one neurone for each possible type of equipment, a third group 8c of input neurones allocated to the field for identifying the part has one neurone for each possible identified part, and a fourth group 8d of neurones allocated to the field for indicating priority has one neurone for each possible level of priority.

Each alarm message MA thus produces its own pattern of logic states on the input neurones 8, this pattern comprising a bit in the 1 state for each of the groups 8a to 8d, as shown in FIG. 3 for the alarm message MA of FIG. 2.

It should be observed that the time fields (date 16 and time of day 18) are not used by the neural network 6, since the neural network operates while conserving time information, i.e. it has a response of the type f(t).

In response to this pattern of logic states, the neural network 6 produces another pattern of logic states on its output neurones 10, referred to as the output pattern, which is a function:

firstly of the input pattern; and
also of prior learning.

Each output neurone is associated with a respective position in a binary word of Ns bits, going from a least significant bit to a most significant bit. The value 0 or 1 of a bit in the binary word is determined by the logic state of the output neurone 10 which is associated therewith. The binary word thus produces a number V(t) which varies over time over a range comprising all integers in the range 1 to $(Ns)^2-1$, and also 0.

The neural network 6 enables inputs to be superposed, i.e. it enables a plurality of different patterns to be present on the input neurone 8 simultaneously as a function of detecting a corresponding number of concomitant alarm messages in the communications network 4. In this case, a plurality of neurones in each group 8a–8d might be at the logic 1 state at any one moment.

On initialization, use is made of the ability of neural networks to learn by reinforcing links between neurones. Learning takes place by connections being modified, starting with examples. The purpose is to convert the alarm messages MA collected from the network 4 into a signal 12 (of value V(t)) which can be interpreted.

In order to be able to teach the neural network, it is necessary to have knowledge about possible alarms. These alarms are reduced insofar as certain alarms are never generated in practice. In addition, on the basis of the fact that any one element might be able to generate a plurality of alarms, the task is facilitated by associating a neurone with a particular element, in the above-specified group, rather than with a particular breakdown. It is merely recorded whether the element is active in generating an alarm, and then the types of alarm generated.

The main correlation that is performed takes place in the series of messages that are possible, but that are necessarily generated, such that the messages at the output are solely messages that are indeed generated.

The above-mentioned learning helps make it possible to tolerate the absence of certain items of data at the input when seeking the root alarm. Furthermore, if new alarms appear that were not learned originally, then the network can nevertheless approach the most plausible alarm, given the knowledge it has previously acquired.

For this purpose, the implementation makes use of a supervised learning algorithm known as the "scaled conjugate gradient". The training pattern has 79 elements.

In normal operation, after the training stage is over, the varying values V(t) obtained at the output from the neural network 6 constitute information about alarms that have been received.

They are then taken up by the extractor 14 where they are processed to extract pertinent information therefrom, and in particular the identity of the root alarm.

For this purpose, the extractor 14 implements time/frequency analysis techniques such as:

the use of techniques in the Cohen class, and in particular the Wigner Ville distribution technique for producing a bilinear distribution of signal energy. These techniques serve to obtain time/frequency representations by analyzing the energy of the signal. The results obtained by means of this distribution can be interpreted in terms of time and frequency data on a linear scale. These techniques are suitable for simultaneously processing time information and frequency information; and/or the use of time scale analysis techniques, and more particularly the use of wavelet transforms that change the signal into coefficients which can be used for analysis and interpretation purposes. They make it possible to obtain time/scale representations (tiling in the time/frequency plane), by grouping together wavelet transforms. The "scalogram" belongs to this class of time scale analysis techniques. This analysis makes use of the resolution properties of wavelet transformations. Nevertheless, it is possible to apply other techniques which enable a level of resolution to be defined in the way the signal is analyzed so as to show up only particular alarms that are of interest.

It is also possible to use a pure frequency technique, such as Fourier analysis or the like, applied to a window of the signal. For example, starting with a sinewave, a spectrum is obtained having a peak which corresponds to the frequency which appears most often in the signal V(t). By previously associating this peak with a breakdown, the breakdown can thus be identified in the network. It should be observed that Fourier analysis is applied to a section only of the signal. Fourier analysis is one of the simplest techniques to implement and is suitable in simple cases. It does not take account of the time aspect of the signal.

Final diagnosis is performed either directly on the basis of observing the results from the above analysis tools, or else by using some other tool. This other tool may use another neural network or vector (or other) quantization to classify and supply the result.

Figure 4:
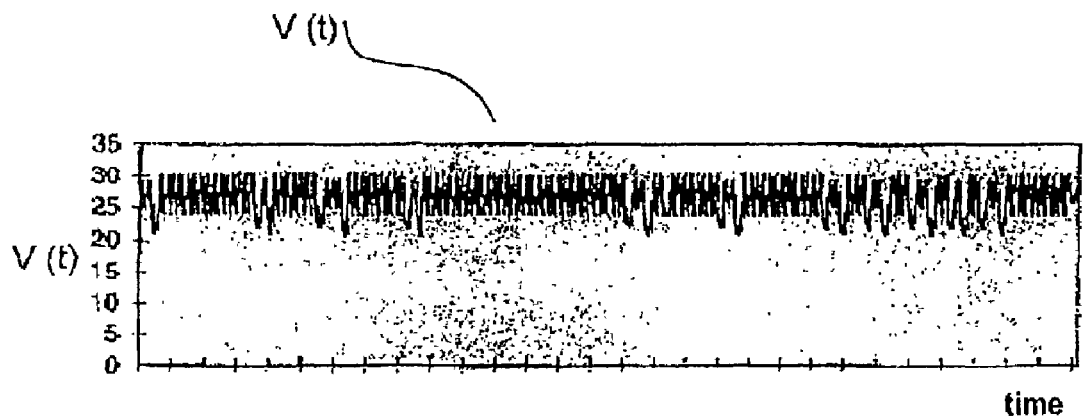
FIG. 4 is a graphical representation of the signal V(t) output by the neural network of the alarm-identifying unit.

By way of example, FIG. 4 shows how the signal V(t) (plotted up the ordinate) produced at the output from the neural network 6 varies over time on a scale of several minutes (plotted along the abscissa). The sample shown corresponds to an alarm situation caused by a break in a fiber interconnecting two pieces of equipment in the SDH type optical fiber network, thereby giving rise to hundreds of alarm messages. For better readability, the discontinuous transitions in the values V(t) are interconnected so as to form a trace that appears to be continuous; there is then said to be a signal V(t) which is suitable for analysis using one of the above-specified time/frequency analysis techniques.

Figure 5:
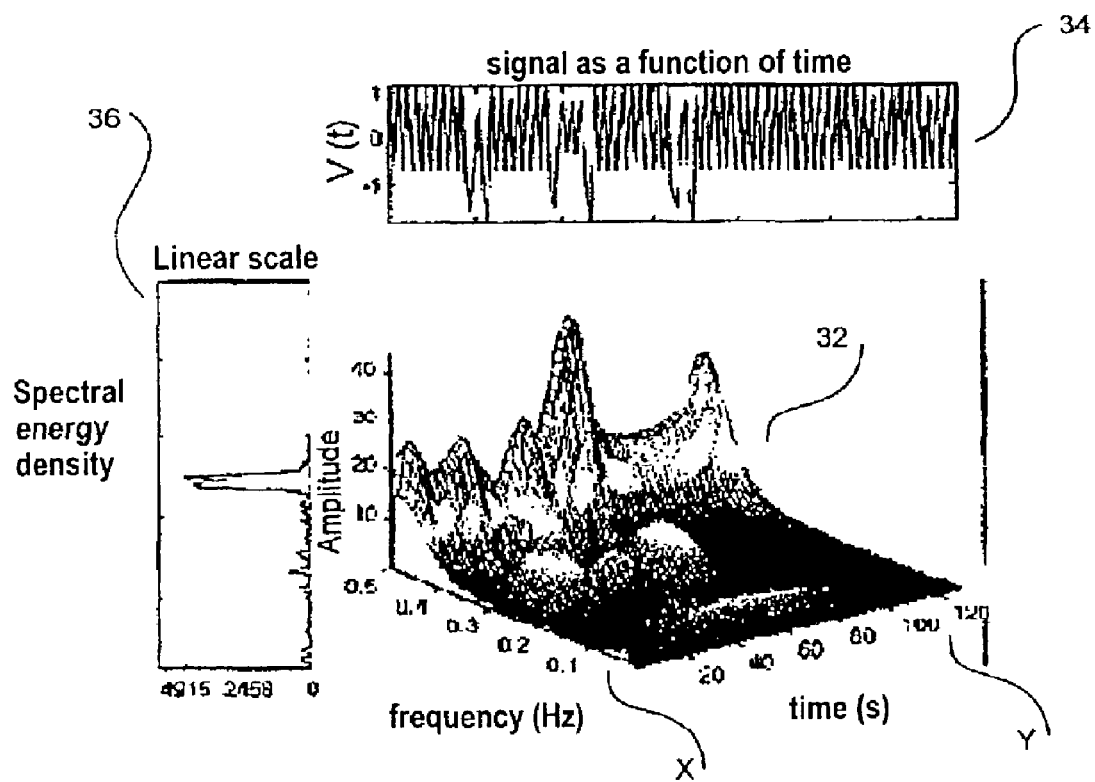
FIG. 5 is a representation of the information delivered in the form of a "scalogram" at the outlet from the extractor of the alarm-identifying unit.

FIG. 5 shows the result of Morlet wavelet analysis on the signal V(t). It comprises three graphics, namely:

- a three-dimensional graphic 32 referred to as a "scalogram" where frequency (Hz) and time (s) are plotted along two orthogonal axes (x and y) in a horizontal plane, and where amplitude is plotted up a third axis (z) perpendicular to said plane. This thus constitutes a bilinear representation of the signal with its peaks corresponding to the pertinent information of the signal;
- a graphic 34 showing how the temporal signal V(t) for analysis varies in time; and
- a graphic 36 showing the spectral density of energy as a function of amplitude, i.e. the spectrum of the temporal signal V(t) for analysis.

The advantage of the global representation of FIG. 5 is that it shows not only the bilinear distribution with its peaks, but also the usefulness of a time/frequency graphic together with the temporal or spectral graphic. The information available for use is thus much richer. Nevertheless, in some cases spectrum alone suffices for analysis purposes.

Locating the maxima in the distribution enables a vector to be extracted that corresponds to a signature for the breakdown. This vector thus enables the breakdown to be identified.

In general, other representations can be envisaged depending on the analysis method used in the analyzer 14. Amongst other possibilities, it is possible to use a spectral representation, a time/frequency representation (energy distribution of the signal in a two-variable time/frequency plane, e.g. using the Wigner Ville distribution), or a time/scale representation, of which the scalogram constitutes one example.

It should be observed that the pertinent information contained in the signal V(t) corresponds to the peaks in the time/frequency representation. The locations of the maxima peaks can be extracted. Each peak gives a vector (instant in time, frequency, and localization of the energy). These vectors correspond to failure signatures and they are used for making a diagnosis.

In general, spatio-temporal techniques are applied in order to see how frequencies change over time and in order to extract a particular signature corresponding to a breakdown. Individual messages are thus no longer generated, but instead a representation (or a pattern) which enables a breakdown to be recognized in terms of time frequency, spatial frequency and amplitude, or in terms of energy (cf. example of FIG. 5). Together these parameters constitute a vector correlated to a series of alarms present in the communications network 4.

The root alarm can be determined from the vector. For example, in a simplified case, a sinewave can represent the arrival of an alarm whose wavelets express alternating alarm starts and alarm ends. A Fourier or similar transform is applied to the sinewave, giving a spectrum of given frequency having an amplitude peak. This corresponds to oscillating between the beginnings and the ends of alarms. These peaks can be correlated in order to identify the root alarm. In this context, it may be observed that a visual representation in which well-identified peaks appear is much easier to assess by a human operator than is a mass of numerical data.

From the above, it will be understood that the above-described diagnosis process operates in two stages:

firstly, the neural network 6 performs preprocessing to correlate alarms, transforming the alarms into a succession of values V(t) carrying frequency and time information; and thereafter, the extractor processes these values V(t) making it possible to interpret alarms easily.

The alarm identifying unit 1 is thus remarkable in several respects:

it tolerates, to some extent, the absence of one or more alarm messages MA. The spectral analysis techniques used rely on statistical data such as averages, or on a set of windows, thus providing facilities for responding in spite of some information being missing;

the two techniques used (neural network and analysis of its output) contribute to robustness. With the neural network 6, learning enables input schemata to be recognized even when they are imperfect or incomplete;

it takes advantage of the advantages of neural networks, in particular the way they operate in a parallel configuration, with knowledge being represented in distributed manner, and the way they learn by modifying connections;

it enables good results to be obtained even with data that is imperfect or ambiguous. The approach is simultaneously robust and capable of good generalization. The loss of some messages does not give rise to any significant modification to the signal and does not degrade the process of diagnosis;

the use of neural networks provides a method that is fast and efficient for correlating alarms, by means of a probabilistic approach. The behavior of the neural network makes it possible to obtain full visualization of all alarms that are active at any one time; and the time/frequency representation enables characteristic elements in the behavior of the signal to be identified. This identification is more robust than using rules, and the resolution property of the wavelet transform provides more advantages.

Numerous variants can be envisaged while remaining within the ambit of the invention, these variants possibly relating in particular to: the network whose alarms are to be analyzed, the alarm messages, the type of learning system used such as a neural network or the like (number of neurones, structure of the layers, interconnections, implementation technology, etc.), techniques for teaching the neural network, the way in which the signal output by the neural network is processed in order to obtain a diagnosis, the criteria for evaluation alarms, etc.

What is claimed is:

1. A method of analyzing alarms coming from a network, comprising:

transforming the detected alarms into a signal V(t) which expresses the variation in time of a digital value representative of all of the detected alarms; and processing the signal V(t), on the basis of which usable information is extracted.

2. A method according to claim 1, wherein the transformation is performed by means of a learning system.

3. The method according to claim 1, wherein the transformation is performed by means of a neural network.

4. The method according to claim 2, wherein each alarm is made up of data fields, the inputs of the learning system are subdivided into groups, with each group being specifically dedicated to a respective field that is taken into account.

5. The method according to claim 4, wherein a particular input of a group of inputs is selected as a function of the content of the field to which said group is dedicated, with each input of a group corresponding to a specific content of a field.

6. The method according to claim 5, wherein at least one group of inputs is provided that is dedicated to a respective one of the following alarm fields:
- a first level of alarm localization indicating a type of network equipment;
- a second level of alarm localization indicating a piece of equipment;
- a reason for an alarm; and
- an indication of priority.

7. The method according to claim 4, wherein a detected alarm is applied to the input of the learning system by selectively setting one input in each group of inputs into a determined logic state.

8. The method according to claim 3, wherein each input corresponds to an input neurone of a neural network, the input neurones being subdivided into groups of inputs.

9. The method according to claim 2, wherein a prior stage of training the learning system is performed by correlating the inputs and outputs of the learning system on the basis of examples of alarm messages.

10. The method according to claim 2, wherein said signal V(t) is obtained in the form of the value of a binary word expressed by output neurones of the learning system.

11. The method according to claim 1, wherein said processing comprises time/frequency analysis of said signal V(t) in order to make a diagnosis.

12. The method according to claim 11, wherein said time/frequency analysis is performed by a technique of the Cohen class.

13. The method according to claim 12, wherein the Wigner Ville distribution is used to produce a bilinear distribution of the energy of said signal V(t).

14. The method according to claim 11, wherein peaks in the distribution obtained by the time/frequency analysis are localized, and respective vectors are extracted there from which correspond to identified alarm signatures.

15. The method according to claim 14, wherein said distribution is interpreted in terms of times and frequencies on a linear scale.

16. The method according to claim 1, wherein said processing comprises time/scale analysis of said treatments V(t) in order to make a diagnosis.

17. The method according to claim 16, wherein wavelet transforms are produced to change said signal V(t) into coefficients for use in making the diagnosis by means of a scalogram.

18. The method according to claim 1, wherein said processing comprises Fourier analysis of the frequency only of said signal V(t), in order to make a diagnosis on the basis of the resulting spectrum.

19. The method according to claim 18, wherein peaks in the spectrum are localized, and respective vectors are extracted therefrom corresponding to identified alarm signatures.

20. An apparatus, for analyzing alarms coming from a network, comprising:
- transformation means for transforming detected alarms into a signal V(t) which expresses variation in time of a numerical value representative of all of the detected alarms;
- processing means for processing the signal V(t), with usable information being extracted therefrom.

* * * * *